E. HANUS.
CAGE FOR ANTIFRICTION BEARINGS.
APPLICATION FILED MAR. 17, 1914.

1,170,899.

Patented Feb. 8, 1916.

Attest:
J. C. Mitchell
M. L. Manning

Inventor:
Ewald Hanus
by
Rogers, Kennedy, Campbell Attys.

UNITED STATES PATENT OFFICE.

EWALD HANUS, OF BERLIN, GERMANY, ASSIGNOR TO DEUTSCHE WAFFEN- UND MUNITIONSFABRIKEN, OF BERLIN, GERMANY, A CORPORATION OF GERMANY.

CAGE FOR ANTIFRICTION-BEARINGS.

1,170,899.  Specification of Letters Patent.  Patented Feb. 8, 1916.

Application filed March 17, 1914. Serial No. 825,220.

*To all whom it may concern:*

Be it known that I, EWALD HANUS, a subject of the King of Prussia, residing at Berlin, Germany, have invented certain new and useful Improvements in Cages for Antifriction-Bearings, of which the following is a specification, reference being had therein to the accompanying drawing.

This invention relates to cages or spacing devices for the rolling elements of antifriction bearings, adapted to be employed between the casing members of the bearing to maintain the rolling elements in spaced relations, and the invention has reference more particularly to that type of cage consisting of an annular body or ring provided at intervals with holes to receive and afford seats for the rolling elements.

The object of the invention is to produce a cage of this type designed more particularly for antifriction bearings in which the rolling elements are in the form of balls, which cage will be of simple construction, in which the balls may be quickly and easily inserted or removed, which will hold the balls securely in place without subjecting them to undue friction, and which may be economically produced.

With these ends in view my invention consists of a cage embodying features of improved construction and form, which will be set forth in detail in the specification, and the novel parts of which will be specified in the claims.

Figure 1:
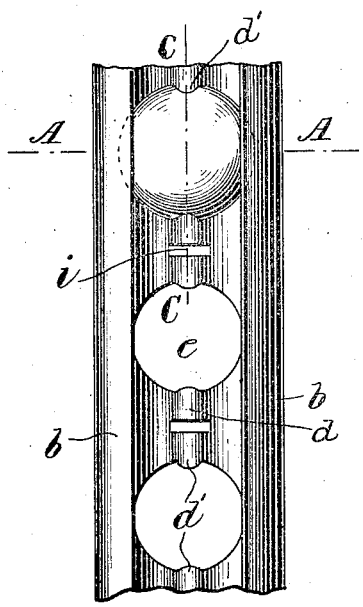
Figure 4:
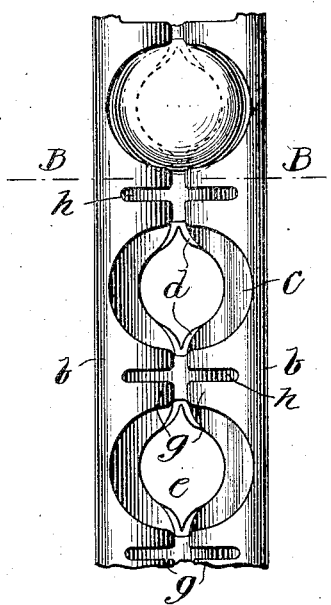
Figure 2:
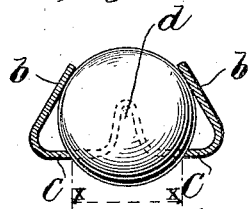
Figure 3:
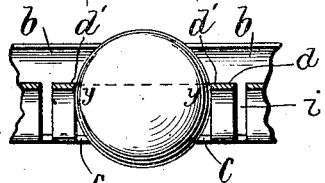

In the accompanying drawings: Figure 1 is a plan view of a portion of a cage in its preferred form, one of the balls being shown confined in its seat; Fig. 2 is a transverse sectional elevation through the same on the line A—A of Fig. 1; Fig. 3 is a longitudinal sectional elevation on the line C—C of Fig. 1; Fig. 4 is a plan view of a portion of a cage in slightly modified form; and Fig. 5 is a transverse sectional elevation through the same on the line B—B of Fig. 4.

Referring to the drawings: in the form represented in Figs. 1, 2 and 3, my improved cage comprises an annular body or ring, preferably of sheet metal, which has its central portion bent on itself to form a radially extending open circumferential fold $d$. Through this fold and the adjacent flat portions C—C, of the ring, openings $e$ are formed at intervals to receive the balls. These openings are so formed, by a milling tool or other appropriate means, that their diameters in a transverse direction will be less than the diameter of the balls, as indicated by the dotted line $x$—$x$ in Fig. 2, and the distance between the upper adjacent ends $d'$, $d'$ of the intact portions of the fold, will also be less than the ball diameters, as indicated by the dotted line $y$—$y$ in Fig. 3, the distance between the remaining portions of the adjacent ends of the intact parts of the fold being as great at least as the diameter of the balls. As a result of this construction, when a ball is seated in its opening, as shown in Figs. 2 and 3, it will be supported on one side of its center by that portion of the walls of the openings which are formed by the flat portions C—C of the ring, and the ball will be embraced at the other side of its center between the upper ends $d'$, $d'$ of the intact portions of the fold. As a result of the formation of the holes through the fold and the adjacent flat portions of the ring, these holes may be temporarily widened or enlarged in a transverse direction, by forcibly spreading the sides of the fold apart, the material of which the cage is formed possessing such spring and resiliency as to permit of this action. The ball may therefore be inserted in its opening by placing it against the walls of the same and then applying sufficient pressure to it to cause the temporary enlargement of the opening to a degree sufficient to permit the ball diameter to pass. On the pressure being removed, the parts of the fold will resume their former relations, thereby contracting the side walls of the opening on the ball, as shown in Fig. 2. In this position the ball will be retained in place conjointly by the ends $d'$ of the intact portions of the fold bearing against the ball at one side of its center, and the side walls of the opening bearing against the ball at the opposite side of its center. As a further means for retaining the balls in position in their holes, the outer edges $b$, $b$ of the ring may be bent inwardly toward each other as shown in Fig. 2 close enough together to prevent the balls from escaping between them; or the distance between these edges may be such as to cause them to bear with a spring pressure on the balls.

The resiliency of the intact portions of the fold may be increased by forming therein transverse slits or slots *i* as shown in Fig. 1.

Figure 5:
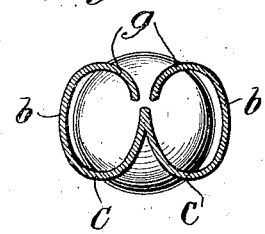

The construction of cage shown in Figs. 4 and 5 is substantially the same as that described, except that the edges of the ring in this instance are extended inwardly at intervals between the ball seats, in the form of tongues *g*, so disposed that they will prevent the escape of the balls from the seats; or they may be disposed so as to bear on the balls with a spring pressure. The resiliency or spring of these tongues may be increased by forming transverse slits or slots *h* therein as shown in Figs. 4 and 5. The insertion of the balls in a ring of this construction may be effected in a manner similar to that described in connection with the other construction; and the removal of the balls from either form of cage may be effected by reversing the assembling operation, and exerting sufficient pressure on the balls to dislodge them from their seats, the parts of the fold yielding sufficiently to permit of this result.

In the accompanying drawings I have shown my invention embodied in the form which in practice I have found to answer to a satisfactory degree the objects and results desired, but it will be manifest that the detailed construction may be modified or changed within the knowledge of a skilled mechanic without departing from the spirit of my invention; and it will be further understood that the invention is not limited to any particular form or construction of the parts except in so far as such limitations are specified in the claims.

Having thus described my invention, what I claim is:

1. A cage for antifriction bearings, comprising an annular resilient body or ring provided with an open circumferential fold having holes therein at intervals to form ball seats, the parts of said fold being adapted to be sprung apart to enlarge the holes to receive the balls; whereby the parts in automatically resuming their former condition will retain the balls in place.

2. A cage for antifriction bearings, comprising an annular body or ring provided with a radially extending circumferential fold having holes at intervals to form ball seats, said holes being adapted to be enlarged temporarily to admit the balls, by spreading the folds.

3. A cage for antifriction bearings, comprising an annular body or ring provided with a radially extending circumferential fold having holes therein at intervals to form ball seats, the intact portions of the fold between the ball seats being slit.

4. A cage for antifriction bearings, comprising an annular body or ring bent between its edges into a circumferential fold, said fold being provided at intervals with holes forming ball seats, and the edges of the annular body being extended inwardly toward each other to confine the balls.

5. A cage for antifriction bearings, comprising an annular body or ring provided with a radially extending circumferential fold provided at intervals with holes to constitute ball seats, and leaving intact portions of the fold between the seats, the distance between the ends of the adjacent intact portions of the fold being less than the diameter of the balls.

In testimony whereof I affix my signature in presence of two witnesses.

EWALD HANUS.

Witnesses:
WOLDEMAR HAUPT,
HENRY HASPER.